United States Patent Office 3,461,148
Patented Aug. 12, 1969

3,461,148
ORGANOSILICON COMPOUNDS AND THE METHOD OF MANUFACTURING URETHANE FOAM BY THE USE OF THE SAID COMPOUNDS
Kihachi Tamura, Musashino-shi, and Isao Nakajima and Kaname Inoue, Tokyo, Japan, assignors to Shin-Etsu Chemical Industry Co., Ltd., Tokyo, Japan, a corporation of Japan
No Drawing. Filed Jan. 29, 1964, Ser. No. 341,123
Claims priority, application Japan, Jan. 29, 1963, 38/3,960; Jan. 31, 1963, 38/4,970, 38/4,971; Feb. 1, 1963, 38/5,069
Int. Cl. C07f 7/18
U.S. Cl. 260—448.8                         6 Claims This invention relates to organosilicon compounds for use in manufacturing polyurethane foam and the method of manufacturing polyurethane foam by the use of the said compounds. More particularly, it relates to organosilicon compounds to give stable cellular or foamed polyurethane products having a uniform cellular structure and the method of manufacturing the same by the use of the said compounds.

As is well known, polyurethane foam is produced by reacting such compounds having active hydrogen as polyester polyols or polyether polyols with water and organopolyisocyanates. The formation of foam is effected by the dispersion of carbon dioxide released from the reaction of polyisocyanate with water in the form of fine bubbles in the viscous body of the polyurethane resin which is simultaneously produced by the reaction of polyisocyanate with the polyol and the subsequent solidification in situ. In some cases a chemically inert low boiling liquid, for example, a fluoroalkane is jointly used as a gas blowing agent.

To obtain certain properties of polyurethane foam, it is necessary that during the manufacture the individual cells should have a certain shape and size, and that the cells should not collapse before a strong gel is formed. There is often a discrepancy between the rate of evolution of blowing gas and the rate at which polyurethane produces chains and crosslinked bonds. In other words, where the gas blowing is conducted at too high a rate, considerable amounts of gas are released before the polyurethane resin attains a sufficient degree of viscosity, causing in an extreme case the collapse of cells due to the boiling of the reacting solution.

Polyurethane foam may be produced by a one-shot process and a prepolymer process. In the one-shot process polyol, polyisocyanate, catalyst and surfactant are mixed and stirred at one time and the gas dispersion, chain growth and crosslinking proceed simultaneously. In the prepolymer process, the viscous polymer is first made by reacting the polyol and polyisocyanate and the resulting polymer, polyol, water, catalyst and surfactants are mixed and stirred to produce the foam composition.

At one time the one-shot process was used for polyester polyurethane alone, and the prepolymer process for polyether polyurethane. This was because no satisfactory catalyst of the type used was available for the one-shot process using the polyether polyol, which is less reactive than polyester polyol with polyisocyanate. In recent years, however, very active catalysts such as organotin compounds and tertiary amine compounds have been discovered. At the same time an organopolysiloxane surfactant has been developed which is remarkably effective in producing a foam of great stability even when a polyether polyol of low viscosity and high surface tension is employed for the formation of the polyurethane. A joint use of these catalysts and surfactant has made possible the manufacture of polyether polyurethane foam by the one-shot process. This process has the advantages over the prepolymer process of being shorter and of eliminating concern over the storage stability and variations in quality of the prepolymer. Consequently the one-shot process is now almost exclusively used in producing a flexible polyether polyurethane foam. The known types of organopolysiloxane surfactant referred to above are dimethylsiloxane oil (British Patent No. 907,971), alkyl trialkoxysilane (U.S. Patent No. 3,050,477) and organopolysiloxane oxyalkylene block copolymer oil (French Patent No. 1,212,252). Of these, dimethylsiloxane oil and alkyl trialkoxy silane are insoluble in water and less effective as surfactant and consequently more likely to collapse cells, particularly in the case of the one-shot process which involves the use of much water. On the other hand organo polysiloxane-oxyalkylene block copolymer oil is soluble in water and is a very effective surfactant. But it lacks stability and has a shorter life when exposed to moisture or used in an aqueous solution. On a rapid lowering of pH, it gradually produces white turbidity and considerably loses its efficiency as a surfactant. The cells then produced become coarser and readily collapsible. These are the difficulties encountered with the last-mentioned surfactant.

The primary object of the present invention is to provide an improved surfactant for use in polyurethane foam production.

The surfactant is a homopolymer comprising the following structural unit (A) or a copolymer comprising the structural unit (A) and one of 3 structures of the structural unit (B) or more than two structures of the structural unit (A) and (B).

(A)
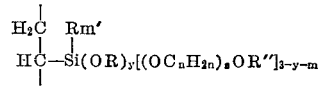

(B)
(i) 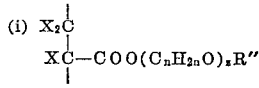

or (ii) 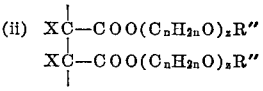

or (iii) 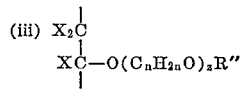

where R and R' represent monovalent hydrocarbon groups; R" and X represent hydrogen or monovalent hydrocarbon groups; $m$ represents 0, 1 or 2; $y$ represents 0, 1 or 2 in the case of a homopolymer and 0, 1, 2 or 3 in the case of a copolymer, $n$ represents 2, 3 or 4 and $z > 1$.

Examples of surfactants according to the present invention are polyoxyalkylene polyvinylsilane homopolymers, vinylsilane-polyoxyalkylene vinylsilane- or polyoxyalkylene alkenyl acid ester copolymers, and polyoxyalkylene vinylsilane- or vinylsilane-polyoxyalkylene alkenyl ether copolymers.

Polyoxyalkylene polyvinylsilane homopolymer may be formed by the condensation of (1) 1 mol of the oily product of polyvinylsilane obtained by heating vinylsilane indicated by the general formula of $$CH_2=CHSiR'_m(OR)_{3-m}$$

(where $m$ represents 0, 1 or 2, and R and R' are monovalent hydrocarbon groups) with or without a polymerization catalyst such as benzoyl peroxide, ditertiary-butyl peroxide and azo-bis-isobutyronitrile and (2) less than 3 mols of linear polyoxyalkylene compounds containing at least one hydroxyl group at one end and being closed by a hydroxyl or alkoxy group at the other end, most of which are indicated by the general formula of $(C_nH_{2n}O)_z$ (where $n$ represents 2, 3 or 4, and $z > 1$), for example monohydroxyoxyethylene-oxy-1,2 propylene monoether or a branched polymer such as glycerin initiated polyoxypropylene polymer. This reaction is effected in a short time by heating to a temperature of over 50° C. or preferably 100° to 200° C. in the presence or absence of a hydrocarbon solvent such as toluene or xylene, preferably with the use of an alkali catalyst such as potassium silanolate or acidic catalyst such as trifluoroacetic acid or p-toluene sulfonic acid at the rate of 1 wt. percent of the major raw material. Also, polyoxyalkylene polyvinylsilane may be formed by polymerization of polyoxyalkylene vinylsilane, indicated by the general formula of $$CH_2=CHSiR'_m(OR)_y[(OC_nH_{2n})_zOR'']_{3-y-m}$$

(where $m$ and $y$ represent 0, 1 or 2; $n$ is 2, 3 or 4; $z > 1$; R and R' are monovalent hydrocarbon groups and R'' is hydrogen or a monovalent hydrocarbon group), which is obtained by condensation of polyoxyalkylene compounds and vinylsilane indicated by the general formula of $CH_2=CHSiR'_mX_{3-m}$ (where $m$ represents 0, 1 or 2, R' represents a monovalent hydrocarbon group, and X is an alkoxy group or a hydrolyzable group such as a halogen group). The polymerization is performed in the presence of a catalyst such as benzoyl peroxide, ditertiary-butyl peroxide or azo-bis-isobutyronitrile at the rate of 1 wt. percent of the major raw material, most preferably in an atmosphere of inert gas such as nitrogen at a temperature of over 50° C. or preferably 100° to 200° C.

Homopolymer of a viscosity can be obtained. The preferable range of viscosity of the surfactant which is used as the cell controller for polyurethane foam is between 10 and 1,000,000 cps. at 25° C. A particularly suitable surfactant for the manufacture of polyurethane foam is the one which consists of 1 to 70 wt. percent of the structural type $—CH_2—CHSiR'_m(OR)_y$ (where $m$ and $y$ represent 0, 1 or 2, and A and R' are monovalent hydrocarbon groups) in the structure of polyoxyalkylene polyvinylsilane. The polyoxyalkylene polyvinylsilane as defined above also includes the type in which part of a hydrolyzable group such as the alkoxy groups of polyoxyalkylene polyvinylsilane has been turned into a hydroxyl group by a minute amount of water.

The copolymer of polyoxyalkylene vinylsilane and polyoxyalkylene alkenyl acid ester and copolymer of polyoxyalkylene vinylsilane and polyoxyalkylene alkenyl ether are formed as follows.

The first method is by the copolymerization of (1) polyoxyalkylene vinylsilane indicated by the general formula of $CH_2=CHSiR'_m(OR)_y[(OC_nH_{2n})_zOR'']_{3-y-m}$ ($m$, $n$, $z$, R, R' and R'' are as defined above, but $y$ is 0, 1, 2 or 3) and (2) polyoxyalkylene alkenyl acid ester or polyoxyalkylene alkenyl ether, or a mixture of the latter two compounds. This reaction is carried out in the presence or absence of a solvent such as cyclohexane, benzene, toluene or xylene, preferably in an atmosphere of inert gas such as nitrogen, by the use of a catalyst such as benzoyl peroxide, ditertiary-butyl peroxide or azo-isobutyronitrile and by heating at a temperature of over 50° C. or preferably 100° to 200° C. In the other method, these copolymers can be formed by copolymerizing $$CH_2=CHSiR'_m(OR)_{3-m}$$

and polyoxyalkylene alkenyl acid ester or polyoxyalkylene alkenyl ether, followed by reaction with a polyoxyalkylene compound in the same procedure as referred to above. The ester and ether used herein respectively represent polyoxyalkylene alkenyl acid ester and polyoxyalkylene alkenyl ether which comprise an alkenyl group such a a vinyl group, substituted vinyl group or an allyl group. The preferable ester and ether are those which contain acrylic acid, methacrylic acid, maleic acid or fumaric acid and the suitable type for the manufacture of polyurethane foam are those in which the molecular content of the unit of $$—CH_2—\overset{|}{C}HSiR_m{'}(OR)_y$$

ranges from 1 to 70 wt. percent.

The vinylsilane polymer and copolymer surfactants according to the present invention not only have very high stability, but also are soluble in water. In the production of polyurethane foam they have a much stronger surfactant effect than vinylalkoxysilane or polyoxyalkylene-modified vinylalkoxysilane and they do not have the above-mentioned disadvantages of organopolysiloxane-oxyalkylene block copolymer oil, there being no reduction in effect even when they are allowed to stand for more than a month at room temperature.

The surfactants of the present invention may be effectively used in the production of polyurethane foam from polyester or polyether polyols, by either the prepolymer or the preferred one-shot process employing known catalysts such as organo tin compounds and/or tertiary amine compounds yielding stable polyurethane foams which have excellent physical properties and uniform fine cells. In the practice of the present invention the known types of polyether polyol may be used as raw materials for polyurethane foam. Each of them has at least one ether linkage and at least two hydroxyl groups in the molecule. However, preferable raw materials are the linear or branched polymers which contain almost no functional group other than the hydroxyl groups. They may include, for example, a linear polymer such as polyoxypropylene glycol, the average molecular weight of which ranges from 300 to 6,000, and a branched polymer such as glycerin-initiated polyoxypropylene triol which has a similar molecular weight of 300 to 6,000. Furthermore, polyols of higher branched structure may also be available, such as polyhydroxy compounds obtained from the reaction of alkylene oxide with trimethylol propane, pentaerythritol or sorbitol. A nitrogen containing polyol such as N,N'-tetrakis(2-hydroxypropyl) ethylenediamine may also be used. Polyester polyols consist of polymers which are obtained from the condensation of polyhydroxy compounds and poly basic organic acids and have the hydroxyl group mainly at the terminal group. The poly basic acids may comprise, for example, saturated aliphatic acids such as adipic acid and sebacic acid; unsaturated aliphatic acids such as maleic acid, fumaric acid and dimer acid; and aromatic acids such as phthalic acid alone or in combination with the single or mixed form. The polyols reacting with those listed above may include ethylene glycol, diethylene glycol, propylene glycol, trimethylol propane, hexanetriol, glycerin and sorbitol alone or in combination.

The preferred polyester polyols, however, for producing polyurethane foam are those which are produced from adipic acid and diethylene glycol. Polyisocyanate which is the other raw material for the manufacture of polyurethane has more than two isocyanate groups in the molecule. The preferred compounds are, for example, 2,4-tolylene diisocyanate, 2,6-tolylene diisocyanate, p,p'-diphenylmethane diisocyanate, polyphenylisocyanate and hexamethylene diisocyanate. The polyether prepolymer used in the prepolymer process consists of a viscous oily product obtained from the reaction of the above-mentioned polyether with the polyisocyanate in excess of its stoichiometric amount. A suitable catalyst is indispensable to the manufacture of polyurethane foam. The following catalysts are preferred: organo tin compounds containing at least one Sn—C bond in the molecule, for example, dibutyl tin dilaurate, tributyl tin acetate and tetraethyl tin, or organo tin compounds without the said Sn—C bond, for example, stannous octoate.

Particularly preferable catalysts are tertiary amines such as triethylamine, N-methyl morpholine, triethylene-diamine, triethanolamine and ethylenediamine.

These organotin compounds and tertiary amine compounds may be used alone or in combination. All other known materials, for example, fluoroalkane as blowing agent, phosphorus compounds as flame-retardants and filler may be also used. The above mentioned vinylsilane polymer and copolymer oil, when used in the production of polyurethane foam, may be previously added to a polyether polyol or polyester polyol or to a mixture of water and catalyst or to fluoroalkane depending on the type of foaming machine used, or otherwise mixed in a manner known in the art. The surfactants according to the invention are preferably used in an amount of from 0.1 to 5 wt. percent of the total weight of the reaction mixture, depending on the mixing ratio of polyol, polyisocyanate, water, and catalyst. The molar ratio of organotin compound to tertiary amine may range between 100:1 and 1:1,000 when they are used together as the catalyst. The desired result is sufficiently attained by the use of such catalyst even at the respective rate of less than 2 wt. percent of the total weight of the reaction mixture. The new vinylsilane polymer and copolymer surfactants of the present invention may also be used jointly with fluoroalkanes such as Freon as blowing agent, with tris(chloromethyl)-phosphate, various phosphites and phosphates, and antimony oxide as flame retardant, with clay and diatomaceous earth as filler and dyestuffs which have hitherto been added or mixed therein. The vinylsilane polymer and copolymer thereof used as surfactant in the present invention not only have remarkable stability, but also permit the manufacture of polyurethane foam of uniform and excellent quality, even though applied in small amounts.

Consequently the present invention eliminates the necessity of first preparing a prepolymer and of thermally hardening the product at high temperatures after the formation of the foam. It considerably reduces the manufacturing cost as compared with the conventional foam making process; and this advantage is effectively available for the prepolymer process. The products of the present invention are useful in making flexible, semirigid, rigid, open or closed cellular polyurethanes and the like. Some specific examples of useful articles which can be made from the products of the present invention are mattresses, cushioning for furniture, pillows, bumpers, insulation for refrigerators and food containers, sandwich construction for panels, walls of buildings vehicles, and lightweight reinforcing material for aircraft, etc.

The present invention is further illustrated by the following examples in which the parts are by weight unless otherwise indicated;

EXAMPLE 1

| | Parts |
|---|---|
| Glycerin-initiated polyoxy propylene triol (average molecular weight 3,000) | 100 |
| Tolylene diisocyanate (2.4 T.D.I./2.6 T.D.I.=80/20) | 54.8 |
| Triethylenediamine | 0.2 |
| Stannous octoate | 0.4 |
| Vinyl triethoxysilane | 2.5 |
| Water | 4.5 |

After the above ingredients except tolylene diisocyanate were stirred for 2 minutes and mixed uniformly, tolylene diisocyanate was added, stirred for 10 seconds and allowed to foam. The resultant foam was unstable and collapsed. A urethane foam could not be produced.

EXAMPLE 2

(A) Manufacture of oxyalkylene vinylsilane:

| | G. |
|---|---|
| Vinyl triethoxysilane | 68 |
| Monohydroxyoxyethyelene-oxy - 1,2 - propylene monobutyl ether (average molecular weight 1700) (oxyethylene content 50 mol percent) | 2,020 |
| Trifluoroacetic acid | 20 |
| Toluene | 3,000 |

By mixing the above ingredients and heating at 115° C. for 4 hrs. in reflux, a condensation product was obtained along with the generation of ethanol. Then, sodium bicarbonate was added to the condensation product for neutralization. After filtration, toluene was removed at a reduced pressure. Then, clear oily matter was obtained. The structure of this is thought to be

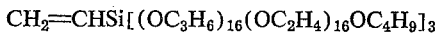

$$CH_2=CHSi[(OC_3H_6)_{16}(OC_2H_4)_{16}OC_4H_9]_3$$

(B) Manufacture of urethane foam:

By using 2.5 parts of oily product of (A) instead of 2.5 parts of vinyl triethoxysilane in the formulation of Example 1, a foam was produced by the same method. The resultant foam was unstable and collapsed. Urethane foam could not be produced.

EXAMPLE 3

(A) Manufacture of ethoxyoxylalkylene vinylsilane:

By using 205 g. of vinyl triethoxysilane instead of 68 g. of vinyl triethoxysilane in the formulation of Example 2(A), the reaction was. A clear oily product was obtaned. The structure of this is thought to be

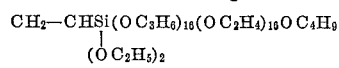

$$CH_2=CHSi(OC_3H_6)_{16}(OC_2H_4)_{16}OC_4H_9$$
$$(OC_2H_5)_2$$

(B) Manufacture of urethane foam:

By using 2.5 parts of oily product in (A) instead of 2.5 parts of vinyl triethoxysilane in the formulation of Example 1, a foam was produced by the same method as Example 1. The foam was unstable and collapsed. Urethane foam could not be produced.

EXAMPLE 4

Manufacture of polyoxyalkylene polyvinylsilane:

100 parts of vinyl triethoxysilane were reacted with 0.1 part of di-tertiary-butyl peroxide in an atmosphere of nitrogen by heating to 130° C. for 6 hrs. Then colorless clear viscous oily polyvinyl triethoxysilane was obtained, the viscosity of which was about 6,000 cps. at 25° C. To 19 parts of this polymer were added 100 parts of monohydroxyoxyethylene oxy-1,2-propylene monobutyl ether which had an average molecular weight of 1,700 and contained 50 mol percent oxyethylene, 100 parts of toluene, and 2 parts of trifluoroacetic acid as catalyst. By heating at 120° C. for 2 hrs. in reflux, a condensation product was obtained along with the generation of ethanol. Then after cooling, sodium bicarbonate was added for neutralization. After filtration, volatile matter such as toluene and ethanol was removed at a reduced pressure. Then 110 parts of colorless clear viscous oily monobutoxy oxyethylene oxy-1,2-propylene polyvinylethoxysilane were obtained, the viscosity of which was about 4000 cps. at 25° C.

The density, refractive index and molecular weight of this oily polymer are 1.03 (25° C.), 1,456 (25° C.) and about 2000, respectively. This polymer presented no change in its condition even after it had been allowed to stand at 23° C. in a humidity of 100% R.H. for a month.

EXAMPLE 5

A foam was prepared by the following recipe:

| | Parts |
|---|---|
| Glycerin-initiated polyoxypropylene trio (average molecular weight 3,000) (hydroxyl value 53.0–58.0) (acid value less than 0.05) | 100 |
| Water | 2.9 |
| Triethylenediamine | 0.1 |
| Dibutyl tin dilaurate | 0.4 |
| Polymer of Example 4 | 1.0 |
| Tolylene diisocyanate (2.4 TDI/2.6 TDI=80:20) | 38.7 |

The above ingredients were divided into three portions: triol containing dibutyl tin dilaurate, a mixed liquid of water, triethylenediamine and the polymer of Example 4, and tolylene diisocyanate. When they were mixed and stirred together at 20° C., they turned into a creamy form in 10 seconds (hereinafter referred to as "creaming time").

Upon transfer into an open mold, expansion by foaming occurred and the said foaming was stabilized at its maximum level in 180 seconds (hereinafter referred to as "rising time"). The foam thus produced consisted of uniform fine open cells and had a density of 0.035 g./cm.$^3$. Also an aqueous solution of triethylenediamine in which the polymer of Example 4 was dissolved at the rate of the aforesaid recipe was allowed to stand for one and two days and one month. The foam produced therefrom after such lapse of time presented no change.

EXAMPLE 6

A foam was prepared by the following recipe:
(Unless otherwise stated, the same polyol and tolylene diisocyanate were used as previously shown.)

| | Parts |
|---|---|
| Glycerin-initiated polyoxypropylene triol | 100 |
| Tolylene diisocyanate | 38.7 |
| Water | 2.9 |
| Stannous octoate | 0.5 |
| Polymer of Example 4 | 1 |

By thorough mixing at 20° C., the above ingredients produced a foam at a creaming time of 10 seconds and a rising time of 120 seconds. The foam thus prepared consisted of uniform fine open cells with a density of 0.033 gr./cm.$^3$. Also the foam produced by the previous dispersion of the polymer of Example 1 in triol was similarly produced with uniform fine open cells.

EXAMPLE 7

67 parts of glycerine-initiated polyoxypropylene triol which has an average molecular weight of about 300 and a hydroxyl value of 53 to 58, 33 parts of ethylenediamine-oxyethylene-oxypropylene tetraol and 33.8 parts of tolylene diisocyanate were heated to 120° C. for reaction. Then 0.5 part of the polymer of Example 4 was added to 100 parts of polyether prepolymer polymerized by addition of the remaining tolylene diisocyanate which had a viscosity of about 5000 cps. at 25° C., and contained 8.3% of isocyanate. On the other hand a mixture was prepared consisting of 1.0 parts of N-methyl morpholine, 0.2 part of triethylamine and 2.3 parts of water.

After mixing by a high speed stirrer, the mass was poured into an open mold, and then subjected to 24 hours hardening at 70° C. after the foam was fully developed. The foam thus produced consisted of uniform fine open cells with a desnity of 0.038 gr./cm.$^3$.

EXAMPLE 8

A thorough mixture was prepared at 20° C. which comprised 100 parts of polyester formed by heated reaction of 100 parts of adipic acid, 73 parts of diethylene glycol, and 5.6 parts of trimethylolpropane which had a viscosity of about 1,000 cps. at 25° C. and a hydroxyl value of about 60, 30.1 parts of tolylene diisocyanate, 2 parts of water, 1.2 parts of N-methyl morpholine and 1 part of the polymer of Example 4. Then a foam product of uniform fine open cells was obtained at a creaming time of 10 seconds and a rising time of 180 seconds. The foam density was 0.032 gr./cm.$^3$.

EXAMPLE 9

A foam was prepared by the following recipe:

| | Parts |
|---|---|
| Glycerine-initiated polyoxypropylene triol | 100 |
| Tolylene diisocyanate | 42.5 |
| Water | 3.4 |
| Triethylenediamine | 0.2 |
| Stannous octoate | 0.5 |
| CCl$_3$F | 1.0 |
| Polymer of Example 4 | 1.4 |

Mixed and stirred at 20° C., the above ingredients produced a foam consisting of uniform fine open cells with a density of 0.025 gr./cm.$^3$ at a creaming time of 10 seconds and a rising time of 80 seconds.

EXAMPLE 10

30 parts of polyvinyl methyl diethoxysilane which was obtained by polymerizing vinyl methyl diethoxysilane under the same conditions as Example 4 were added into 100 parts of monohydroxyoxyethyleneoxy - 1,2 - propylene monobutyl ether, and by reacting them in the same manner monobutoxyoxyethyleneoxy-1,2-propylene polyvinyl methylsilane was obtained. A foam was produced from this oily polymer.

| | Parts |
|---|---|
| Polyoxypropylene glycol (average molecular weight 2,000) (hydroxyl value 54.8–57.8) (acid value less than 0.2) | 50 |
| Glycerine-initiated polyoxypropylene trio | 50 |
| Tolylene diisocyanate | 37.3 |
| Water | 2.6 |
| Triethylenediamine | 0.1 |
| Stannols octoate | 0.4 |
| The said polymer | 1.0 |

Thoroughly mixed and stirred at 20° C., the above ingredients produced a foam of uniform fine open cells with a density of 0.042 gr./cm.$^3$ at a creaming time of 10 seconds and a rising time of 150 seconds.

EXAMPLE 11

Preparation of a copolymer of vinyl triethoxysilane and monobutovyoxyethyleneoxy-1,2 propylene maleic acid ester.

A mixture of 4.9 parts of maleic anhydride, 185 parts of monohydroxyoxyethyleneoxy - 1,2 - propylene monobutyl ether and 200 parts of toluene was reacted with 0.3 part of concentrated sulfuric acid at 120° C. for 6 hrs., followed by neutralization by sodium bicarbonate. After filtration, toluene and other volatile materials were removed at a reduced pressure. Then clear oily monobutoxyoxyethyleneoxy-1,2-propylene maleic acid ester was obtained. Then a mixture of 50 parts of this ester and 50 parts of vinyl triethoxysilane was reacted with 0.5 part of ditertiary butyl peroxide by 24 hours of heating at 130° C. 180 parts of an oily copolymer were produced the viscosity of which was about 2,000 cps. at 25° C.

EXAMPLE 12

A foam was prepared by the following recipe:

| | Parts |
|---|---|
| Glycerin-initiated polyoxypropylene triol | 100 |
| Tolylene diisocyanate | 38.7 |
| Water | 2.9 |
| Triethylenediamine | 0.1 |
| Stannous octoate | 0.4 |
| Polymer of Example II | 0.8 |

Mixed and stirred at 20° C., the above ingredients produced a foam consisting of uniform fine open cells with a density of 0.035 gr./cm.$^3$ at a creaming time of 10 seconds and at a rinsing time of 180 seconds.

Also this oily copolymer which was mixed with water and triethylene diamine at the ratio specified in the above recipe was left to stand at room temperature for two weeks. The foam which was then prepared from the said materials along with the other ingredients similarly consisted of uniform fine open cells.

EXAMPLE 13

A foam was prepared by the following recipe:

| | Parts |
|---|---|
| Glycerin-initiated polyoxypropylene triol | 100 |
| Tolylene diisocyanate | 38.7 |
| Water | 3.0 |
| Stannous octoate | 0.5 |
| Polymer of Example 11 | 0.5 |

Mixed and stirred at 20° C., the above ingredients produced a foam consisting of uniform fine open cells with a density of 0.032 gr./cm.$^3$ at a creaming time of 10 seconds and a rinsing time of 110 seconds.

It is to be understood that in accordance with the provisions of the patent statutes, the particular form of composition or product shown and described and the particular procedures set forth are presented for purpose of explanation and illustration and that various modifications of said composition or product and procedure can be made without departing from this invention.

What is claimed is:

1. A polyoxyalkylene polyvinylsilane having the following structural unit:

$$\begin{array}{c} H_2C \\ | \\ HC-Si-[(OC_nH_{2n})_zOR'']_{3-y-m} \\ | \\ (OR)_y \end{array} \begin{array}{c} R'_m \end{array}$$

wherein R and R' are independently selected from the group consisting of alkyl and aryl radicals, R'' is selected from the group consisting of hydrogen, alkyl and aryl radicals, $m$ and $y$ are integers of from 0 to 2, $y+m < 3$, $n$ is an integer of from 2 to 4, and $z > 1$.

2. A method of manufacturing a polyoxyalkylene polyvinylsilane as claimed in claim 1 which comprises condensing (1) a polyoxyalkylene compound containing at least one hydroxyl group at the end of the molecule and being closed by an alkoxy group at the other end, which are indicated by the general formula of $(C_nH_{2n}O)_z$ where $n$ is an integer of from 2 to 4, and $z > 1$, and (2) a vinylsilane indicated by the general formula of $$CH_2=CHSiR'_m—X_{3-m}$$

wherein R' is selected from the group consisting of alkyl and aryl radicals, X is selected from the group consisting of halogens and alkoxy radicals, $m$ is an intger of from 0 to 2, and polymerizing the resulting condensate in the presence of a polymerization catalyst selected from the group consisting of organic peroxides and organic azo compounds.

3. A method of manufacturing a polyoxyalkylene polyvinylsilane as claimed in claim 1, which comprises polymerizing, by heat, in the presence of a polymerization catalyst selected from the group consisting of organic peroxides and organic azo compounds, a vinylsilane indicated by the general formula of $$CH_2=CHSiR'_m—(OR)_{3-m}$$

wherein R and R' are independently selected from the group consisting of alkyl and aryl radicals, $m$ is an integer of from 0 to 2, and condensing (1) the resulting polymer and (2) a linear polyoxyalkylene compound being closed by at least one hydroxy group at one end of the molecule and being closed by an alkoxy group at the other end, which are indicated by the general formula of $(C_nH_{2n}O)_z$ where $n$ is an integer of from 2 to 4, and $z > 1$.

4. An organosilicon copolymer which contains at least one following structural unit (A) and at the same time at least one following structural unit (B) in the molecule:

(A)
$$\begin{array}{c} H_2C \\ | \\ HC-Si-[(OC_nH_{2n})_zOR'']_{3-y-m} \\ | \\ (OR)_y \end{array} \begin{array}{c} R'_m \end{array}$$

(B)
$$\begin{array}{c} | \\ HC-COO(C_nH_{2n}O)_zR'' \\ | \\ HC-COO(C_nH_{2n}O)_zR'' \\ | \end{array}$$

wherein R and R' are independently selected from the group consisting of alkyl and aryl radicals, R'' is selected from the group consisting of hydrogen, alkyl and aryl radicals, $m$ is an integer of from 0 to 2, $y$ is an integer of from 0 to 2, $y+m < 3$, $n$ is an integer of from 2 to 4, and $z > 1$.

5. A method of manufacturing an organosilicon copolymer as claimed in claim 4, which comprises copolymerizing (1) a polyoxyalkylene polyvinylsilane having units indicated by the general formula of $$CH_2=CHSiR'_m(OR)_y—[(OC_nH_{2n})_zOR'']_{3-y-m}$$

and (2) a polyoxyalkylene maleic acid ester having units indicated by the general formula of $$\begin{array}{c} HC-COO(C_nH_{2n}O)_zR'' \\ \| \\ HC-COO(C_nH_{2n}O)_zR'' \end{array}$$

wherein R and R' are independently selected from the group consisting of alkyl and aryl radicals, R'' is selected from the group consisting of hydrogen, alkyl and aryl radicals, $m$ is an integer of from 0 to 2, $y$ is an integer of from 0 to 2, $y+m < 3$, $n$ is an integer of from 2 to 4, and $z > 1$.

6. A method of manufacturing an organosilicon copolymer as claimed in claim 4, which comprises condensing (a) a linear polyoxyalkylene compound being closed by at least one hydroxy group at one end of the molecule and being closed by an alkoxy group at the other end, which are indicated by the general formula of $(C_nH_{2n}O)_z$ where $n$ is an integer of from 2 to 4, and $z > 1$, and (b) the copolymer which is obtained by copolymerizing (1) a vinylsilane indicated by the general formula of $$CH_2=CHSiR'_m—(OR)_{3-m}$$

wherein R and R' are independently selected from the group consisting of alkyl and aryl radicals, and $m$ is an integer of from 0 to 3, and (2) a polyoxyalkylene maleic acid ester having units indicated by the general formula of $$\begin{array}{c} HC-COO(OC_nH_{2n})_zR'' \\ \| \\ HC-COO(OC_nH_{2n})_zR'' \end{array}$$

wherein R'' is selected from the group consisting of hydrogen, alkyl and aryl radicals, $n$ is an integer of from 2 to 4, and $z > 1$.

References Cited
UNITED STATES PATENTS

| | | | |
|---|---|---|---|
| 2,777,868 | 1/1957 | Mixer et al. | 260—448.8 |
| 2,777,869 | 1/1957 | Bailey et al. | 260—448.8 |
| 2,811,541 | 10/1957 | Curry | 260—448.2 |
| 3,170,894 | 2/1965 | Brown et al. | 260—448.8 |
| 3,272,762 | 9/1966 | Ibbotson et al. | 260—448.8 |

TOBIAS E. LEVOW, Primary Examiner

P. F. SHAVER, Assistant Examiner

U.S. Cl. X.R.

260—2, 827